(12) United States Patent
Dissanayake

(10) Patent No.: US 11,743,081 B2
(45) Date of Patent: Aug. 29, 2023

(54) GENERATING INTERMEDIATE FREQUENCY CONTENT WITH ON-OFF KEYING MODULATION OF A RADIO FREQUENCY SIGNAL

(71) Applicant: University of Virginia Patent Foundation, Charlottesville, VA (US)

(72) Inventor: Anjana Dissanayake, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 181 days.

(21) Appl. No.: 17/249,187

(22) Filed: Feb. 23, 2021

(65) Prior Publication Data

US 2021/0281451 A1    Sep. 9, 2021

Related U.S. Application Data

(60) Provisional application No. 62/986,218, filed on Mar. 6, 2020.

(51) Int. Cl.
| | | |
|---|---|---|
| *H04L 27/04* | (2006.01) | |
| *H04B 1/00* | (2006.01) | |
| *H04L 27/00* | (2006.01) | |

(52) U.S. Cl.
CPC ........... *H04L 27/04* (2013.01); *H04B 1/0096* (2013.01); *H04L 27/0014* (2013.01)

(58) Field of Classification Search
CPC .... H04L 27/04; H04L 27/0014; H04B 1/0096
See application file for complete search history.

(56) References Cited

U.S. PATENT DOCUMENTS

| | | | |
|---|---|---|---|
| 9,780,776 B1 | 10/2017 | Golan | |
| 2009/0304118 A1* | 12/2009 | Yuanzhu | ............... H04B 7/0854 455/275 |
| 2019/0281548 A1* | 9/2019 | Kristem | ............ H04W 52/0216 |
| 2022/0263472 A1 | 8/2022 | Moody et al. | |

FOREIGN PATENT DOCUMENTS

| | | |
|---|---|---|
| CN | 109326722 | 2/2019 |
| CN | 109556711 | 4/2019 |
| WO | WO 95/30275 | 11/1995 |
| WO | WO 2020/242540 | 12/2020 |

OTHER PUBLICATIONS

Mangai, et al. "A 0.42nW 434MHz −79.1dBm Wake-Up Receiver with a Time-Domain Integrator," IEEE International Solid-State Circuits Conference, 2019, 3 pages.

Wang, et al. "A 6.1-nW Wake-Up Receiver Achieving −80.5-dBm Sensitivity Via a Passive Pseudo-Balun Envelope Detector," IEEE Solid-State Circuits Letters, vol. 1, No. 5, May 2018, 4 pages.

(Continued)

*Primary Examiner* — Kabir A Timory
(74) *Attorney, Agent, or Firm* — Weaver Austin Villeneuve & Sampson LLP

(57) ABSTRACT

Methods and apparatus are described in which IF content is generated at an RF receiver without off-chip MEMS, a local oscillator, or a phase-locked loop, and using a transmitter that transmits a single RF tone.

20 Claims, 4 Drawing Sheets

(56) References Cited

OTHER PUBLICATIONS

Moody, et al., "A −106dBm 33nW Bit-Level Duty-Cycled Tuned RF Wake-up Receiver," Symposium on VLSI Circuits Digest of Technical Papers, 2019, 2 pages.
Dissanayake, et al. "A −108dBm Sensitivity, −28dB SIR, 130nW to 41pW, Digitally Reconfigurable Bit-Level Duty-Cycled Wakeup and Data Receiver," IEEE, 2020, 4 pages.
Seok, et al., "A 2.4GHz, −102dBm-Sensitivity, 25kb/s, 0.466mW Interference Resistant BFSK Multi-Channel Sliding-IF ULP Receiver," Symposium on VLSI Circuits Digest of Technical Papers, 2017, 2 pages.
Huang, et al., "A 915 MHz, Ultra-Low Power 2-Tone Transceiver With Enhanced Interference Resilience," IEEE Journal Of Solid-State Circuits, vol. 47, No. 12, Dec. 2012, 11 pages.
Lee, et al. "A CMOS MedRadio Transceiver With Supply-Modulated Power Saving Technique for an Implantable Brain-Machine Interface System," IEEE Journal Of Solid-State Circuits, vol. 54, No. 6, Jun. 2019, 12 pages.
Bdiri, et al. "An 868MHz 7.5pW wake-up receiver with −60dBm sensitivity," Journal of Sensors and Sensor Systems, 5, 433-446, 2016, 14 pages.
PCT International Search Report and Written Opinion dated Apr. 9, 2020, issued in Application No. PCT/US2020/013834.
International Preliminary Report on Patentability dated Dec. 9, 2021, for International Application No. PCT/US2020/013834.

\* cited by examiner

GENERATING INTERMEDIATE FREQUENCY CONTENT WITH ON-OFF KEYING MODULATION OF A RADIO FREQUENCY SIGNAL

INCORPORATION BY REFERENCE

An Application Data Sheet is filed concurrently with this specification as part of this application. Each application to which this application claims benefit or priority as identified in the concurrently filed Application Data Sheet is incorporated by reference herein in its entirety and for all purposes.

BACKGROUND

Conventional On-Off Keying (OOK) modulation of a radio frequency (RF) signal typically involves a transmitter configured to transmit RF energy at one carrier frequency or RF tone, and a modulation scheme in which the RF energy of the transmitter is turned on and off to represent two different symbols. That is, when the RF tone is on for the symbol duration, the symbol is a "1," and when it is off for the symbol duration, the symbol is a "0." More than two symbols can be represented by using different amplitudes of the RF tone during the non-zero symbol durations, a type of modulation typically referred to as amplitude-shift keying (ASK) modulation. OOK modulation is the simplest case of ASK.

On the receiver side, an envelope detector may be used to down-convert the RF signal from the transmitter by rectifying the input power to detect the incoming symbols. Alternatively, the receiver may down-convert the RF signal using a local oscillator, followed by an envelope detector, a phase-locked loop, or some kind of demodulation scheme to detect the symbols. The former approach at the receiver can be highly sensitive to noise and interfering signals. The latter is less sensitive to noise but uses a significant amount of power for the down-conversion of the input signal.

Tuned radio frequency (TRF) receivers have achieved high sensitivity (e.g., better than −100 dBm) by adding duty-cycled active RF gain. However, this improved sensitivity requires using bulky off-chip high-Q narrow-band MEMS which increase integration costs and form factor. Moreover, narrow MEMS bandwidths and constrained tunability limits multi-channel operation. Multi-channel operation is desirable for improving channel efficiency and node density in, for example, a large scale Internet of Things (IoT) network. On the other hand, multi-channel operation conventionally requires a power hungry circuitry (e.g., phase-locked loops) or multi-tone transmission schemes.

SUMMARY

According to a particular class of implementations, methods and systems are provided in which a radio frequency signal is generated with a transmitter. The radio frequency signal is characterized by a carrier frequency. Without changing the carrier frequency, the radio frequency signal is modulated during a sequence of symbol periods by turning the transmitter on and off during at least some of the symbol periods using a corresponding one of a plurality of modulation frequencies. Each modulation frequency corresponds to one of a plurality of information channels.

According to a particular implementation of this class, modulating the radio frequency signal includes modulating the radio frequency signal with a first modulation frequency during each symbol period of a first subset of the symbol periods. The transmitter is turned off during an entirety of each symbol period of a second subset of the symbol periods.

According to another particular implementation of this class, modulating the radio frequency signal includes modulating the radio frequency signal with a first modulation frequency during each symbol period of a first subset of the symbol periods, and modulating the radio frequency signal with a second modulation frequency during each symbol period of a second subset of the symbol periods.

According to another particular implementation of this class, modulating the radio frequency signal includes modulating the radio frequency signal with a first modulation frequency during each symbol period of a first subset of the symbol periods, modulating the radio frequency signal with a second modulation frequency during each symbol period of a second subset of the symbol periods, and modulating the radio frequency signal with a third modulation frequency during each symbol period of a third subset of the symbol periods.

According to another particular implementation of this class, modulating the radio frequency signal includes modulating an amplitude of the radio frequency signal such that each of the at least one or more symbol periods corresponds to one of a plurality of amplitudes.

According to another particular implementation of this class, each of the information channels represents a corresponding symbol or a corresponding set of symbols.

According to another particular implementation of this class, a second radio frequency signal is generated. The second radio frequency signal is characterized by a second carrier frequency different from the first carrier frequency. Without changing the second carrier frequency, the second radio frequency signal is modulated during the sequence of symbol periods by turning the second radio frequency signal on and off during at least some of the symbol periods using a corresponding one of a second set of modulation frequencies. Each modulation frequency of the second set of modulation frequencies corresponds to one of a second plurality of information channels. According to a more specific implementation, the second radio frequency is generated by the transmitter or a second transmitter.

According to another particular implementation of this class, the radio frequency signal is demodulated to capture information embedded in the plurality of information channels.

According to another particular implementation of this class, the radio frequency signal is down-converted using a local oscillator for which an oscillation frequency is uncertain, thereby generating a first down-converted signal characterized by an uncertain intermediate frequency. The first down-converted signal is down-converted using a passive envelope detector thereby generating a second down-converted signal from which the modulation frequencies may be extracted by channel filtering.

According to another class of implementations, a radio frequency receiver includes an antenna configured to receive a radio frequency signal. The radio frequency signal is characterized by a carrier frequency that is modulated during each symbol period of a sequence of symbol periods using a corresponding one of a plurality of modulation frequencies. Each modulation frequency corresponds to one of a plurality of information channels. The receiver includes a passive envelope detector configured to convert the radio frequency signal to an intermediate frequency signal. A plurality of bandpass filtering signal paths are configured to receive the intermediate frequency signal. Each bandpass filtering signal path is tuned to a corresponding one of the information channels. Comparison circuitry is configured to compare output signals generated by the bandpass filtering signal paths. Analog-to-digital conversion circuitry is configured to digitize an output signal of the comparison circuitry. Symbol detection circuitry is configured to detect a corresponding symbol for each of the symbol periods based on a digitized output of the analog-to-digital conversion circuitry, thereby capturing information embedded in the plurality of information channels.

According to particular implementation of this class, the radio frequency signal is modulated with a first modulation frequency during each symbol period of a first subset of the symbol periods, and the carrier frequency of the radio frequency is turned off during an entirety of each symbol period of a second subset of the symbol periods.

According to another particular implementation of this class, the radio frequency signal is modulated with a first modulation frequency during each symbol period of a first subset of the symbol periods, and the radio frequency signal is modulated with a second modulation frequency during each symbol period of a second subset of the symbol periods.

According to another particular implementation of this class, the radio frequency signal is modulated with a first modulation frequency during each symbol period of a first subset of the symbol periods, the radio frequency signal is modulated with a second modulation frequency during each symbol period of a second subset of the symbol periods, and the radio frequency signal is modulated with a third modulation frequency during each symbol period of a third subset of the symbol periods.

According to another particular implementation of this class, an amplitude of the radio frequency signal is modulated such that each of the at least one or more symbol periods corresponds to one of a plurality of amplitudes.

According to another particular implementation of this class, each of the information channels represents a corresponding symbol or a corresponding set of symbols.

According to another class of implementations, a radio frequency transmitter includes a radio frequency source configured to generate a radio frequency signal characterized by a carrier frequency. Modulation circuitry is configured to modulate the radio frequency signal during each symbol period of a sequence of symbol periods using a corresponding one of a plurality of modulation frequencies. Each modulation frequency corresponds to one of one or more information channels. An antenna is configured to transmit the modulated radio frequency signal.

According to a particular implementation of this class, the modulation circuitry is configured to modulate the radio frequency signal with a first modulation frequency during each symbol period of a first subset of the symbol periods, and the modulation circuitry is configured to turn off the carrier frequency of the radio frequency during an entirety of each symbol period of a second subset of the symbol periods.

According to another particular implementation of this class, the modulation circuitry is configured to modulate the radio frequency signal with a first modulation frequency during each symbol period of a first subset of the symbol periods, and the modulation circuitry is configured to modulate the radio frequency signal with a second modulation frequency during each symbol period of a second subset of the symbol periods.

According to another particular implementation of this class, the modulation circuitry is configured to modulate an amplitude of the radio frequency signal such that each of the at least one or more symbol periods corresponds to one of a plurality of amplitudes.

A further understanding of the nature and advantages of various implementations may be realized by reference to the remaining portions of the specification and the drawings.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes implementations in which one or more channels of IF content may be embedded in a single-tone RF signal. According to some implementations, such IF content may be captured at an RF receiver without off-chip MEMS, a local oscillator, or a phase-locked loop.

According to a particular class of implementations a single-tone OOK signal is modulated at the IF rate to realize down-conversion. The spectrum of an OOK signal contains most of the energy in the carrier and the $1^{st}$ upper and lower side lobes spread apart at modulation rate. Upon entering a square-low envelope detector, these tones intermix to create a strong down-converted IF signal. An example will be instructive.

Figure 1:
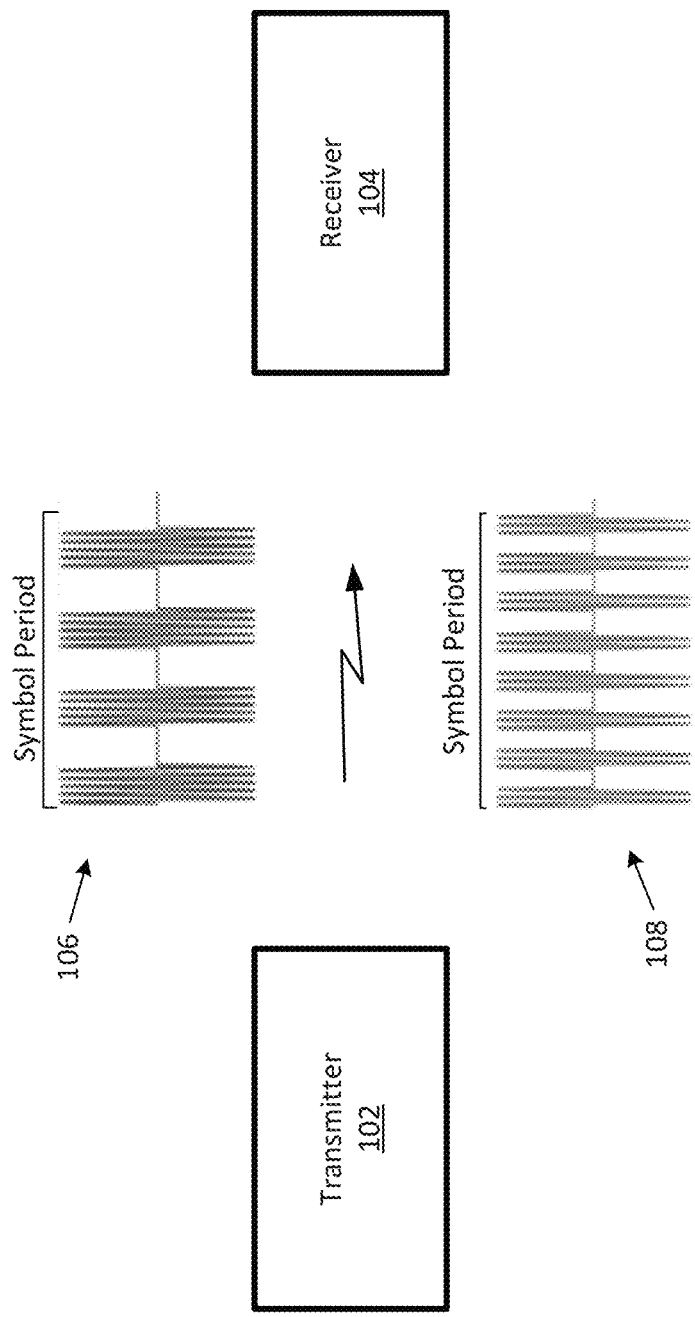
FIG. 1 is a simplified block diagram of a transmitter and receiver configured to generated and demodulate RF signals generated as enabled by the present disclosure.

According to various implementations enabled by the present disclosure and as illustrated in FIG. 1, an RF tone generated by a transmitter 102 is modulated during the symbol period, e.g., by turning the RF tone on and off during the symbol period instead of keeping it on for the duration of the symbol period. As will be discussed, the frequency of this modulation shows up as IF content in the signal at the output of an envelope detector (ED) (not shown) of receiver 104. The modulation frequency (e.g., the frequency with which the RF tone is turned on and off during the symbol period) corresponds to a particular symbol, set of symbols, or channel. In this way, two or more symbols may be represented using a single-tone transmitter, each of which is represented by an IF tone at the output of the receiver's ED.

FIG. 1 illustrates one example in which different modulations of the same RF tone represent two different symbols 106 and 108.

The RF tone of the transmitter and the modulation frequency for a given symbol intermodulate to generate IF content. The ED of the receiver acts as a self-mixer to the modulated symbol, generating a corresponding IF tone. The ED generates an average dc level, and the envelope of the modulated signal, e.g., a square wave at the modulation frequency at the output of ED and frequency content at twice the carrier frequency. High frequency content can be removed with a low pass filter. This effectively creates an IF channel or channelization at IF without using a local oscillator.

Put another way, the ED detects the envelope of the RF so, because the envelope is modulated, the modulation signal is passed through the ED. One approach described herein employs a variant of OOK signaling to modulate the envelope with two different square wave frequencies so as to pass two different IF symbols. As will be described, other OOK variants of are contemplated. A significant benefit of using such OOK variants is the simplicity of transmitter implementation. However, it should be noted that contemplated variants of the techniques described herein include the use of non-OOK modulations.

Figure 2:
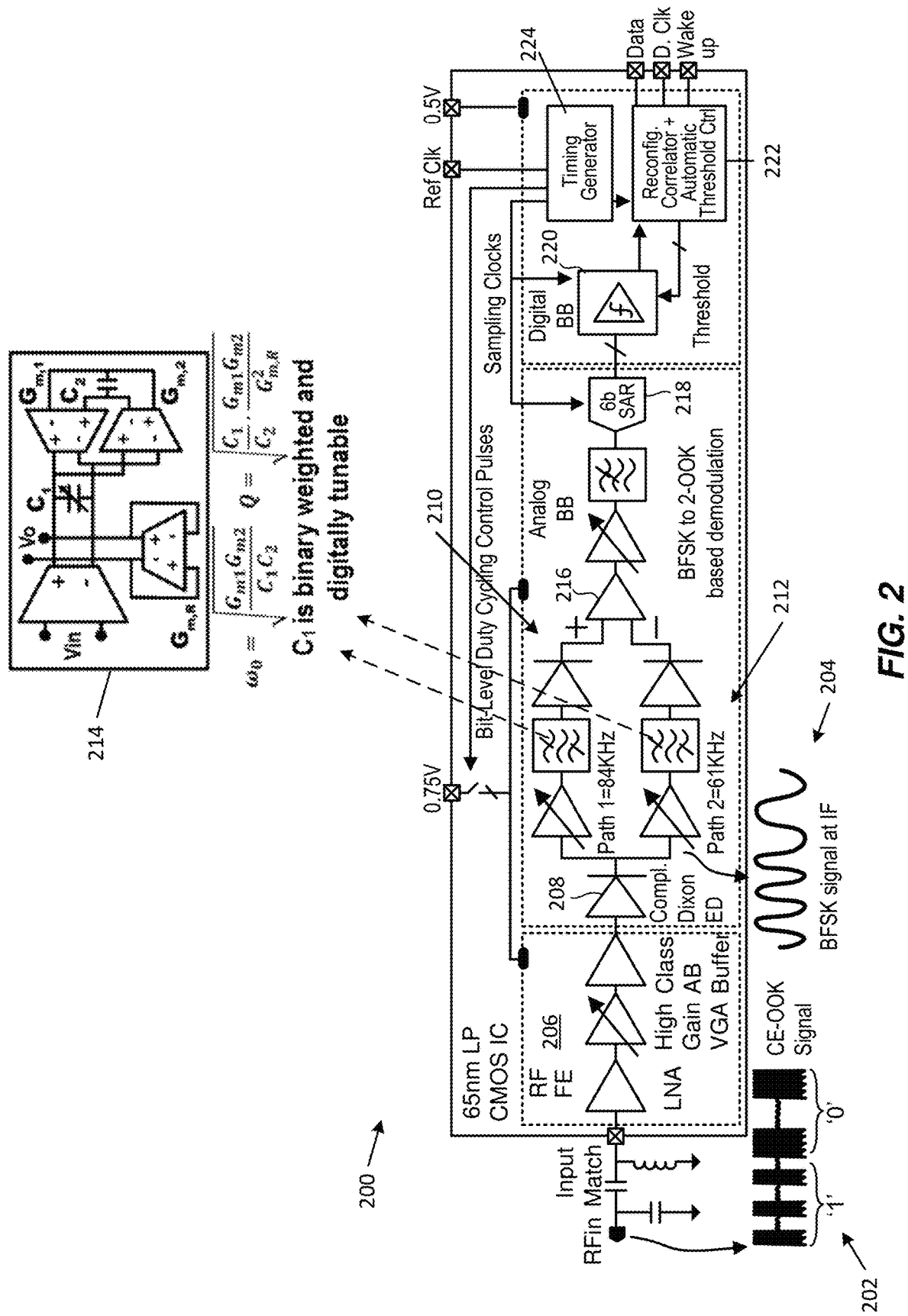
FIG. 2 is a simplified block diagram of an example of a receiver configured to demodulate RF signals generated as enabled by the present disclosure.

One example of a context in which the techniques enabled by the present disclosure may be employed is illustrated in FIG. 2. However, it should be noted that the signaling techniques enabled by this disclosure are much more widely applicable and may be used, for example, in any context in which symbols are represented in the modulation of an RF signal. Another example is described below with reference to FIG. 4.

Yet another context in which implementations enabled by the present disclosure may provide benefits is described in A 915 MHz, *Ultra-Low Power 2-Tone Transceiver With Enhanced Interference Resilience*, X. Huang, A. Ba, P. Harpe, G. Dolmans, H. de Groot, and J. R. Long, IEEE Journal of Solid-State Circuits, vol. 47, no. 12, pp. 3197-3207, December 2012, the entire disclosure of which is incorporated herein by reference for all purposes. The diversity of these examples serves to emphasize the broad applicability of the techniques described herein.

Figure 3:
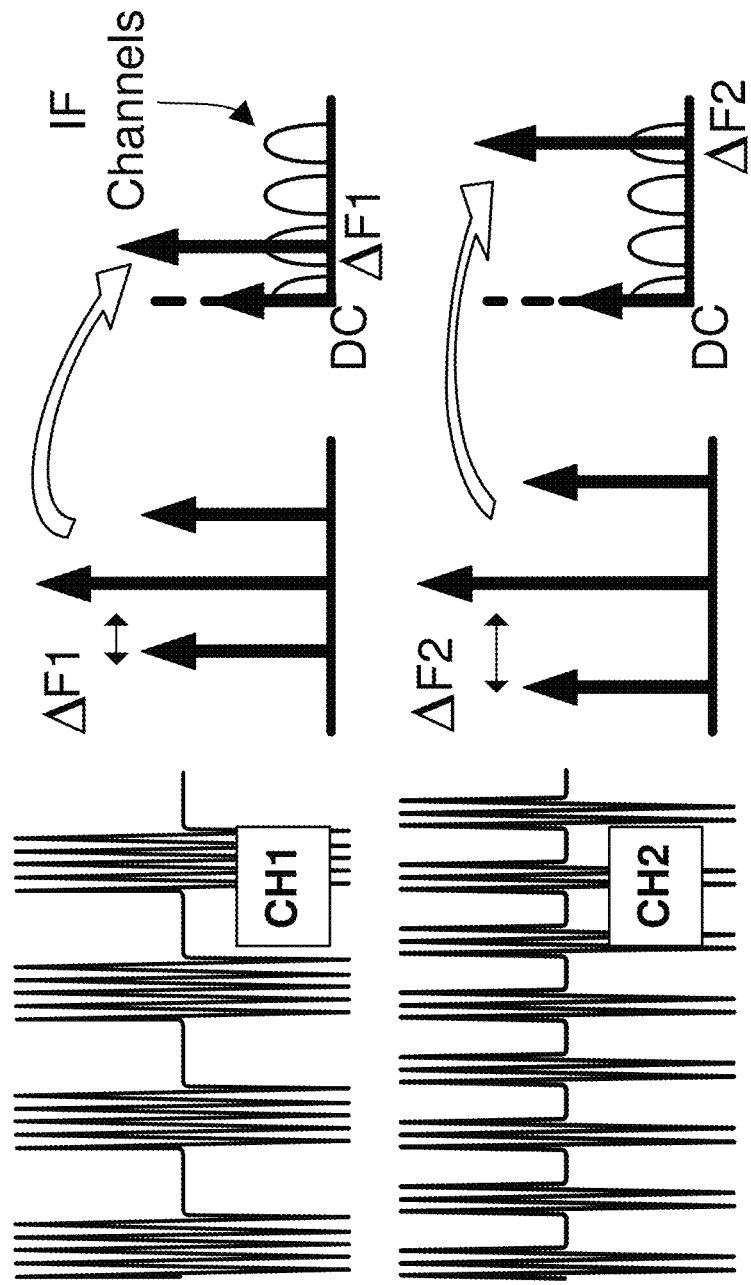
FIG. 3 illustrates a particular example of intermediate frequency (IF) content embedded in an RF OOK signal as enabled by the present disclosure.

Referring to FIG. 2, receiver 200 has a bit-level duty cycled, tuned radio frequency (TRF) topology to achieve high sensitivity for low average dc power. A content-embedded on-off-key (CE-OOK) modulated RF signal 202 encodes messages (e.g., a wakeup message) with both '1' and '0' symbols encoded using two different IF channels to create an IF binary frequency shift keying (BFSK) waveform 204 as illustrated in FIG. 3. The use of two different modulation frequencies F1 and F2 enables further separation of the symbols with respect to noise floor.

RF signal 202 is amplified with high gain RF frontend (RFFE) 206 using a cascade of ring amplifiers to achieve an initial simulated gain (e.g., approximately 60 dB). The amplified RF signal is then down-converted with a passive envelope detector 208 (e.g., a passive triode-mode Dickson type ED) by which the symbols '0' and '1' are down-converted to IF BFSK signal 204 in which each symbol maps to a different intermediate frequency (IF) channel. Signal 204 is fed to a symbol detecting IF block with parallel bandpass filtering paths 210 and 212, each tuned to one of the channels. According to a specific implementation, digitally tunable symbol filters are implemented using Gm-C bandpass filters 214 to achieve significant suppression of the opposite symbol channel.

The rectified voltage in each IF path is compared against the other (216) and digitized with a multi-bit (e.g., 6-bit) successive approximation register (SAR) analog-to-digital converter (ADC) 218. The resulting multi-bit value is digitally compared against a target threshold (220) generating a bit decision. A 64-bit reconfigurable correlator 222 with programmable error tolerance is used to detect the transmitted code. According to a specific implementation, programmable timing generator 224 provides dedicated duty cycling pulses to both RFFE 206 and the analog baseband (BB) circuitry for power saving purposes.

According to some implementations, a "1" may be represented by a corresponding IF tone at the receiver, while a "0" may be represented by keeping the RF tone of the transmitter off during the corresponding symbol period. As will be appreciated, for implementations in which the down-converted signal at the output of the ED is a square wave at the modulation frequency, there will be primary and harmonic IF tones, the latter of which may be filtered.

The IF content is processed in the baseband to extract the symbol for each symbol duration. Any wideband interferer at or near the RF tone will affect the RF signal (and therefore the two IF tones) the same way. As such taking the difference of signal powers of the two modulation frequencies will yield interference suppression advantages, i.e., such interference becomes common mode for the IF tones.

According to some implementations, and as discussed above with reference to FIGS. 2 and 3, the RF tone may be modulated using a first frequency F1 (e.g., 60 kilobits per second) to represent a "1," and a second frequency F2 (e.g., 30 kilobits per second) to represent a "0." At the output of the receiver's ED in the receiver there would be two corresponding IF tones (e.g., one at 60 kHz and 30 kHz) along with some DC content. According to some implementations, the use of two distinct modulation frequencies to represent two symbols may provide greater separation between the symbols than implementations in which the transmitter is turned off for one of the symbols.

Figure 4:
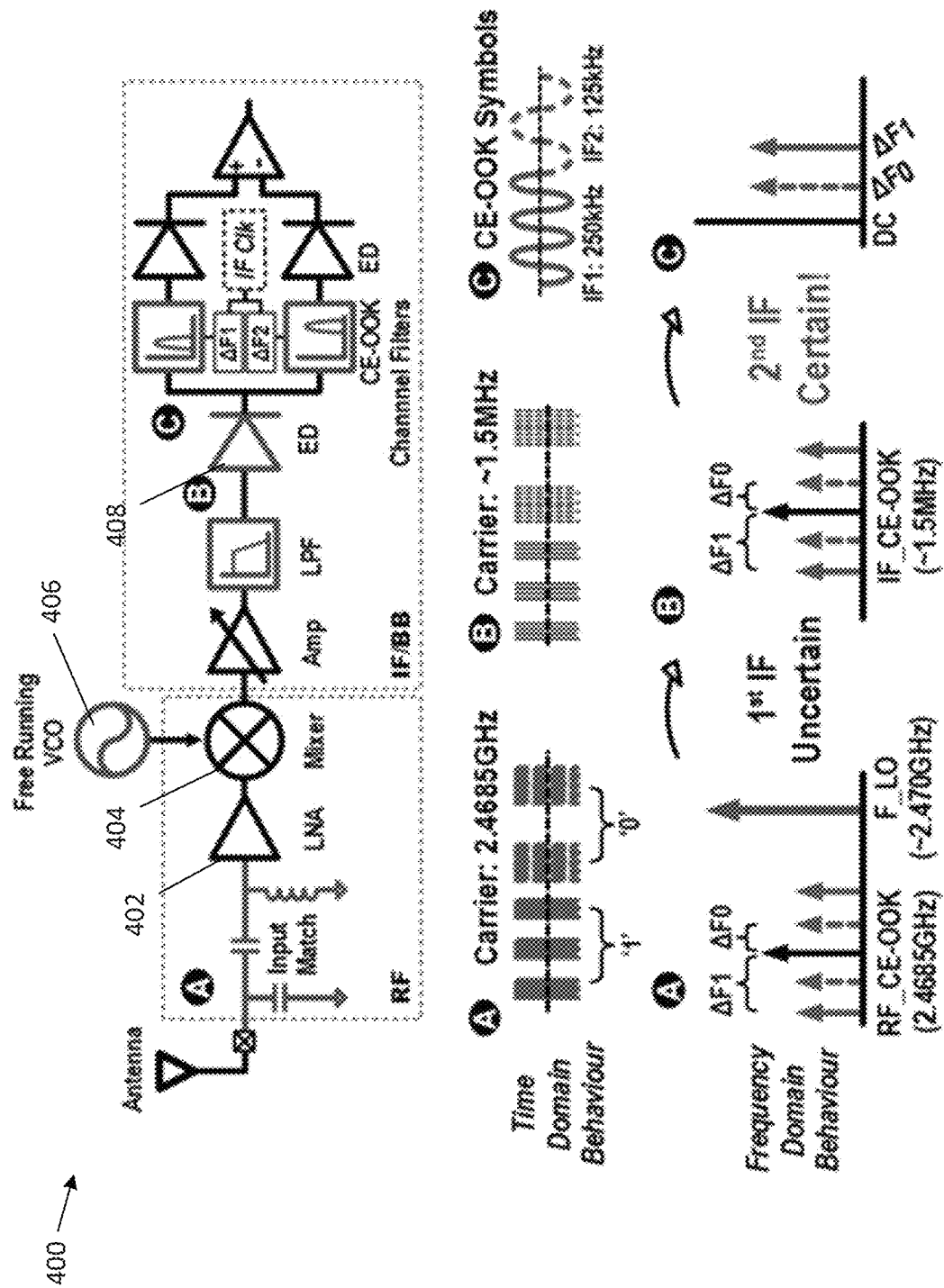
FIG. 4 illustrates another example of a receiver configured to demodulate RF signals generated as enabled by the present disclosure.

According to some implementations, CE-OOK signaling enabled by the present disclosure can be used to address the uncertainty associated with down-conversion in a receiver using an unlocked free-running voltage controlled-oscillator (VCO) as shown in FIG. 4. The RF signal received by receiver 400 is amplified through an optional low noise amplifier (LNA) 402 and then down-converted using mixer 404 which is driven by a free-running VCO 406 whose carrier frequency is uncertain. Because of the uncertainty of this architecture (known as Uncertain-IF), the down-converted signal lies in an uncertain intermediate frequency. And because the IF is uncertain, channel selection filtering cannot typically be employed in an Uncertain-IF receiver. However, CE-OOK signaling enabled by the present disclosure can be used in such a receiver to enable channel filtering.

That is, if the down-converted signal employs CE-OOK signaling, then rectifying this signal produces exact channel information embedded in the RF signal. This may be understood with reference to the time-domain and frequency-domain representations of the signals at A, B, and C in receiver 400. In the depicted example, the RF carrier (at A) is at 2.4685 GHz and the symbols "1" and "0" are represented by modulations at 250 kHz (IF1) and 125 kHz (IF2), respectively. The frequency F_LO of VCO 406 is near 2.470 GHz such that the down converted signal (at B) lies near 1.5 MHz but is uncertain. However, subsequent down-conversion of the signal at B by envelope detector (ED) 408 yields a signal at C in which the information channels represented by the CE-OOK modulations are certain and may be extracted as described above.

In addition to examples described above, implementations are contemplated in which the transmitter transmits RF energy at a single frequency or tone (e.g., 1 GHz). By turning the RF tone on and off during the symbol period, IF content is generated at the receiver that represents one or more symbols, sets of symbols, or channels. In addition, the modulation frequency or rate at which the RF tone is turned on and off may correspond to a particular channel or symbol (e.g., 0 or 1 for a two-channel implementation). That is, the rate at which the RF tone is turned on and off shows up as a corresponding IF tone at the output of the ED. More generally, an arbitrary number of symbols or channels may be represented, each with a corresponding modulation frequency or modulation scheme; as many as can be reliably introduced. The RF tone itself is not of particular importance. Rather, it is the modulation frequencies or schemes that correspond to the IF content at the receiver. As will be appreciated, the number of symbols or channels that can be represented for a given RF band depends on a number of factors including, for example, the sharpness of the filters used to detect the corresponding IF tones.

According to some implementations, additional information may be encoded in a single-tone RF signal generated in accordance with any of the implementations described above. In addition to each modulation frequency or scheme corresponding to a particular channel, the amplitude of the RF tone may be modulated such that each amplitude associated with a particular channel represents a symbol, i.e., multiple symbols may be represented within each channel, with each symbol in a given channel being represented by a different DC level of the IF tone at the output of the ED.

At least some implementations enabled by the present disclosure (but not necessarily all) may be characterized by one or more of the following advantages:

The generation of non-dc IF content at the output of a receiver's ED enables channel selection at IF. The many advantages of creating such IF content may also be applicable. Some examples of possible advantages of non-dc IF content include, but are not limited to:

Channel selection at IF

Interference filtering to improve the interference tolerance

DC offset rejection and suppression possible due to no information at DC, increased linearity of the receiver.

Fixing the uncertainty of IF involved in free-running oscillator based downconversion (uncertain IF architecture)

Channel selection and/or channelization at IF allows for one or more of (1) filtering the wanted signal while suppressing interferers; (2) providing dedicated channel assignments to each of multiple receivers, e.g., frequency domain multiple access can be realized in this way; (3) acting as another dimension of a correlator, e.g., conventionally a correlator performs a function, e.g., issues a wakeup, when the incoming bit stream matches the correlator's pre-set code. With IF channel creation, the correlator code can be made to match to the incoming bit stream as well as the IF channels in which they are being sent. For example, if the correlator code is 1111-0000-1100, the correlator rule for issuing a wake up can be that 1111 comes from channel 1, 0000 comes from channel 2, and 1100 comes from channel 3 instead of sending the entire message in one channel; and/or (4) providing suppression of both continuous-wave and pulsed interferers.

Techniques described herein may be used with an emulated OOK or any other transmission method capable of required maximum modulation frequency. Maximum modulation frequency corresponds to the maximum channel frequency we can use for a given implementation.

Since IF content can be kept away from DC, techniques enabled by the present disclosure can be used with active rectifiers providing higher open circuit voltage sensitivity (OCVS) while not being corrupted by the 1/f noise of EDs.

As will be appreciated with reference to the foregoing description, IF content that may represent one or more symbols, sets of symbols, and/or channels is generated at an RF receiver without a local oscillator, and using a transmitter that transmits only a single RF tone.

It should be noted that, even though some implementations are described that use transmitters configured to generate only a single RF tone, implementations are contemplated in which multiple RF tones may be used (e.g., using carrier filters in a tuned-RF implementation) in addition to at least some combinations of the modulation schemes described above. That is, each of multiple RF tones can be modulated in the various ways described above and transmitted simultaneously with the other RF tone(s), each being modulated with its own scheme. With appropriate separation between the RF tones and filtering after the ED of the receiver, the resulting IF tones and/or respective amplitudes for each of the RF tones can be detected. Multiple RF tones may also be used in the context of an Uncertain-IF implementation with local oscillators in the receiver tuned to the different RF tones (which are set sufficiently far apart relative to the uncertainty of the local oscillators).

It should also be noted that such multi-tone implementations can be implemented using a single transmitter configured to transmit at multiple carrier frequencies, or multiple transmitters each of which is a single-tone transmitter. Either way, the receiver will be sensitive to each of the tones and able to detect the symbols embedded in each tone as described herein.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects.

What is claimed is:

1. A method, comprising:

generating a radio frequency signal with a transmitter, the radio frequency signal being characterized by a carrier frequency; and without changing the carrier frequency, modulating the radio frequency signal during a sequence of symbol periods by turning the transmitter on and off during at least some of the symbol periods using a corresponding one of a plurality of modulation frequencies, including modulating the radio frequency signal with a first modulation frequency during each symbol period of a first subset of the symbol periods;

wherein each modulation frequency corresponds to one of a plurality of information channels.

2. The method of claim 1, the method further comprising turning the transmitter off during an entirety of each symbol period of a second subset of the symbol periods.

3. The method of claim 1, wherein modulating the radio frequency signal further includes modulating the radio frequency signal with a second modulation frequency during each symbol period of a second subset of the symbol periods.

4. The method of claim 1, wherein modulating the radio frequency signal further includes modulating the radio frequency signal with a second modulation frequency during each symbol period of a second subset of the symbol periods, and modulating the radio frequency signal with a third modulation frequency during each symbol period of a third subset of the symbol periods.

5. The method of claim 1, wherein modulating the radio frequency signal includes modulating an amplitude of the radio frequency signal such that one or more symbol periods corresponds to one of a plurality of amplitudes.

6. The method of claim 1, wherein each of the information channels represents a corresponding symbol or a corresponding set of symbols.

7. The method of claim 1, further comprising:
generating a second radio frequency signal, the second radio frequency signal being characterized by a second carrier frequency different from the carrier frequency; and
without changing the second carrier frequency, modulating the second radio frequency signal during the sequence of symbol periods by turning the second radio frequency signal on and off during at least some of the symbol periods using a corresponding one of a second set of modulation frequencies;
wherein each modulation frequency of the second set of modulation frequencies corresponds to one of a second plurality of information channels.

8. The method of claim 7, wherein the second radio frequency signal is generated by the transmitter or a second transmitter.

9. The method of claim 1, further comprising demodulating the radio frequency signal to capture information embedded in the plurality of information channels.

10. The method of claim 1, further comprising:
down-converting the radio frequency signal using a local oscillator for which an oscillation frequency is uncertain, thereby generating a first down-converted signal characterized by an uncertain intermediate frequency; and
down-converting the first down-converted signal using a passive envelope detector thereby generating a second down-converted signal configured for application of channel filtering to extract the modulation frequencies.

11. A radio frequency receiver, comprising:
an antenna configured to receive a radio frequency signal, the radio frequency signal being characterized by a carrier frequency, the radio frequency signal being modulated during a sequence of symbol periods using a corresponding one of a plurality of modulation frequencies, including being modulated with a first modulation frequency during each symbol period of a first subset of the symbol periods, each modulation frequency corresponding to one of a plurality of information channels;
a passive envelope detector configured to convert the radio frequency signal to an intermediate frequency signal;
a plurality of bandpass filtering signal paths configured to receive the intermediate frequency signal, each bandpass filtering signal path being tuned to a corresponding one of the information channels;
comparison circuitry configured to compare output signals generated by the bandpass filtering signal paths;
analog-to-digital conversion circuitry configured to digitize an output signal of the comparison circuitry; and
symbol detection circuitry configured to detect a corresponding symbol for each of the symbol periods based on a digitized output of the analog-to-digital conversion circuitry, thereby capturing information embedded in the plurality of information channels.

12. The radio frequency receiver of claim 11, wherein the carrier frequency of the radio frequency signal is turned off during an entirety of each symbol period of a second subset of the symbol periods.

13. The radio frequency receiver of claim 11, wherein the radio frequency signal is modulated with a second modulation frequency during each symbol period of a second subset of the symbol periods.

14. The radio frequency receiver of claim 11, wherein the radio frequency signal is modulated with a second modulation frequency during each symbol period of a second subset of the symbol periods, and wherein the radio frequency signal is modulated with a third modulation frequency during each symbol period of a third subset of the symbol periods.

15. The radio frequency receiver of claim 11, wherein an amplitude of the radio frequency signal is modulated such that one or more symbol periods corresponds to one of a plurality of amplitudes.

16. The radio frequency receiver of claim 11, wherein each of the information channels represents a corresponding symbol or a corresponding set of symbols.

17. A radio frequency transmitter, comprising:
a radio frequency source configured to generate a radio frequency signal characterized by a carrier frequency;
modulation circuitry configured to modulate the radio frequency signal during a sequence of symbol periods using a corresponding one of a plurality of modulation frequencies, including being configured to modulate the radio frequency signal with a first modulation frequency during each symbol period of a first subset of the symbol periods, each modulation frequency corresponding to one of one or more information channels; and
an antenna configured to transmit the modulated radio frequency signal.

18. The radio frequency transmitter of claim 17, wherein the modulation circuitry is configured to turn off the carrier frequency of the radio frequency signal during an entirety of each symbol period of a second subset of the symbol periods.

19. The radio frequency transmitter of claim 17, wherein the modulation circuitry is configured to modulate the radio frequency signal with a second modulation frequency during each symbol period of a second subset of the symbol periods.

20. The radio frequency transmitter of claim 17, wherein the modulation circuitry is configured to modulate an amplitude of the radio frequency signal such that one or more symbol periods corresponds to one of a plurality of amplitudes.

* * * * *